O. BONNEY.
Band-Sawing Machine.
Reissued March 23, 1875.
No. 6,340.
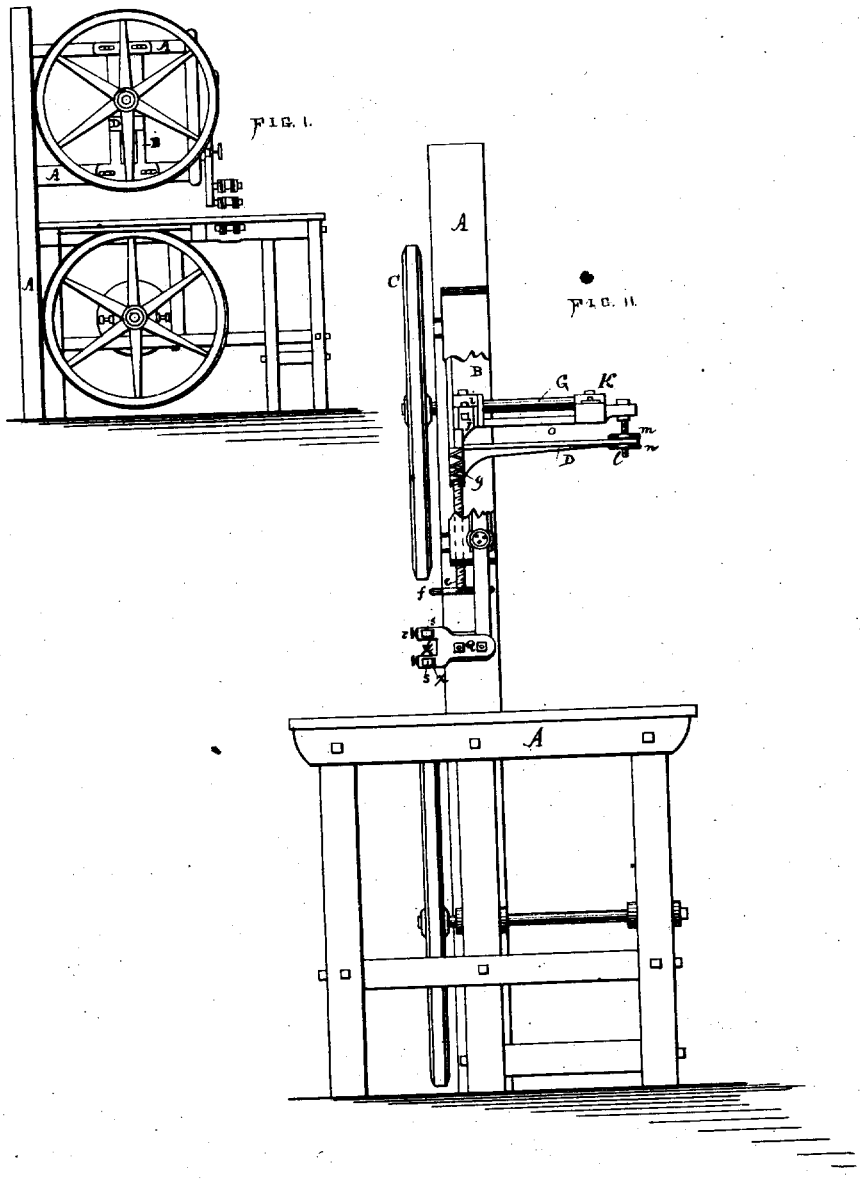
WITNESSES.
F. B. Townsend.
Will H. Moore
INVENTOR.
Alpha Bonney
by A. H. Evans & Co
his Atty's.
THE GRAPHIC CO. PHOTO.-LITH. 39 & 41 PARK PLACE, N.Y.

UNITED STATES PATENT OFFICE.

OLPHA BONNEY, OF SAN FRANCISCO, CALIFORNIA.

IMPROVEMENT IN BAND SAWING-MACHINES.

Specification forming part of Letters Patent No. 138,121, dated April 22, 1873; reissue No. 6,340, dated March 23, 1875; application filed February 19, 1875.

*To all whom it may concern:*

Be it known that I, OLPHA BONNEY, of San Francisco, California, have invented certain Improvements in Band Sawing-Machines; and I hereby declare the following to be a full, clear, and exact description thereof.

The object of my invention is to provide such an arrangement of the upper pulley over which the band-saw of a band sawing-machine passes as to permit of its being tipped out of a perpendicular position, in order to prevent the saw from working forward off of the pulley when running, and more especially to counteract the pressure of the material which is being sawed, and prevent it from forcing the saw from the pulley while the pressure is being applied. My invention also consists in the employment of a spring for equalizing the tension of the saw during its expansion and contraction. It further consists of a simple and easily-operated arrangement for securing the steel faces, against which the back of the saw bears, and also for adjusting the gibs between which it runs.

In order to more fully illustrate and explain my invention, reference is had to the accompanying drawing, forming a part of this specification, in which—

Figure 1 is a side elevation. Fig. 2 is an end view.

A represents the frame of a band sawing-machine. B is the vertical timber in which the upper pulley C is supported, as shown at Fig. 1, by means of the horizontal bracket D, which can be moved up and down along the slot in the timber, in the manner of a slide. This bracket is moved up and down along the slot in the vertical timber by means of the screw *e* and hand-wheel *f*; and in order to regulate the tension of the saw, I bore out a hole in the bracket above the screw, and insert a spiral or other spring, *g*, as shown at Fig. 2, so that the weight of the pulley and bracket will bear upon the spring. This will permit the saw to expand and contract, and preserve a uniform tension at all times. The shaft G, to the outer end of which the upper pulley C is secured, is supported at some point between its middle and the pulley C in a box, *i*. This box is suspended between lugs *j*, which extend upward from opposite sides of the bracket D by journals or trunnions, as shown, so that it can be turned upon them, as desired. The opposite end of the shaft G is supported in a box, *k*, from which a screw, *l*, depends, passing through a nut or small hand-wheel, and through the rear end of the bracket D. Another nut or hand-wheel, *n*, is then turned upon the lower end of the screw below the bracket, so as to firmly secure the screw by the binding of the nuts above and below. The boxes *i* and *k* are connected by a bar, *o*, so that they shall at all times maintain their relative positions to each other.

Now it is evident that, by elevating the rear end of the shaft G by means of the screw *l* and nuts *m n*, the upper portion of the pulley C will be tipped forward, so as to cause its rim to present a beveled surface for the saw to move upon, and to resist the tendency of the saw to be shifted from the wheel when the necessary working-pressure is brought to bear upon it.

The block Q, which supports the saw midway between the upper and lower pulleys, over which it passes, is also improved by providing a thumb-screw, *r*, which sits against the gibs *s*, and steel or glass plate *t*, in its face. These thumb-screws bind against the gibs, and the gibs press upon the steel plate, against which the back of the saw presses, so that by simply turning the screw so as to free the gibs and plate they can be adjusted as desired, and again secured without trouble.

By this means I provide a simple and cheap arrangement of the frame and pulleys of a band sawing-machine, which will be much more convenient to operate and manage, and at the same time be more effective than the ordinary band sawing-machine.

I am aware that the upper pulley, over which the band-saw passes, has been tipped out of its vertical position by the use of two screws, as shown in the patent of John T. Plass, dated September 6, 1870.

I therefore do not claim, broadly, the tipping of the upper pulley from its vertical position; but

What I claim as new, and desire to secure by Letters Patent, is—

1. The pulley-shaft G, supported at a point between its middle and the pulley C in a suspended box, in combination with the screw *l* and nuts *m* and *n*, substantially in the manner and for the purpose set forth.

2. The block Q, with its gibs *s s*, and steel bearing-plates *t*, and screws *r*, in combination with the vertically-adjustable support and frame A, as and for the purpose set forth.

OLPHA BONNEY.

Witnesses:
JNO. L. BOONE,
C. M. RICHARDSON.